(12) United States Patent
Voisin et al.

(10) Patent No.: US 8,397,564 B2
(45) Date of Patent: Mar. 19, 2013

(54) DEVICE AND PROCESS FOR DETERMINING THE FLOW REGIME AND/OR THE DIRECTION OF A FLUID FLOW

(75) Inventors: Dimitri Voisin, La Foret Fouesnant (FR); Michel Desjoyeaux, La Foret Fouesnant (FR); Clement Rive, Lorient (FR)

(73) Assignee: Mer Agitee, La Foret Fouesnant (FR)

( * ) Notice: Subject to any disclaimer, the term of this patent is extended or adjusted under 35 U.S.C. 154(b) by 514 days.

(21) Appl. No.: 12/675,565

(22) PCT Filed: Sep. 3, 2008

(86) PCT No.: PCT/FR2008/001228
§ 371 (c)(1),
(2), (4) Date: Jul. 13, 2010

(87) PCT Pub. No.: WO2009/066013
PCT Pub. Date: May 28, 2009

(65) Prior Publication Data
US 2010/0300197 A1  Dec. 2, 2010

(30) Foreign Application Priority Data
Sep. 5, 2007  (FR) ...................................... 07 06196

(51) Int. Cl.
*G01P 13/00* (2006.01)

(52) U.S. Cl. ...................... 73/170.03; 73/170.01; 73/861

(58) Field of Classification Search .......................... None
See application file for complete search history.

(56) References Cited

U.S. PATENT DOCUMENTS

| | | | |
|---|---|---|---|
| 3,696,673 A | | 10/1972 | Ribner et al. |
| 3,934,471 A | * | 1/1976 | White et al. ................ 73/861.04 |
| 4,221,134 A | * | 9/1980 | Ekstrom, Jr. .................... 73/721 |
| 5,272,915 A | | 12/1993 | Gelbach et al. |
| 5,315,878 A | * | 5/1994 | Birenheide ...................... 73/727 |

(Continued)

FOREIGN PATENT DOCUMENTS

| | | |
|---|---|---|
| DE | 31 38 985 | 4/1983 |
| DE | 44 43 665 | 6/1996 |

(Continued)

OTHER PUBLICATIONS

International Search Report dated May 8, 2009, from corresponding PCT application.

*Primary Examiner* — Lisa Caputo
*Assistant Examiner* — Jermaine Jenkins
(74) *Attorney, Agent, or Firm* — Young & Thomspon (57) ABSTRACT

A device for determining the flow regime and/or the direction of a fluid flow close to an element exposed to the flow, such as a sail, includes at least one dog-vane (1). The device further includes at least one flexible strip (2), one region (5) of the strip being fastened to the element (7) exposed to the flow and another region (15) of the strip being free relative to the element, so as to enable the strip and the free region extending substantially parallel to the element to flex, the dog-vane being fixed via one of its ends to the free region of the flexible strip. The device includes conversion element (3, 3', 3A, 3B, 3'A, 3'B, 3C, 3D, 3'C, 3'D) for converting the deformations undergone by the strip into an electrical signal, relative to a reference position, and processing element (4) for processing the electrical signals.

20 Claims, 3 Drawing Sheets

U.S. PATENT DOCUMENTS

| | | | |
|---|---|---|---|
| 5,877,415 A | 3/1999 | Kruse | |
| 6,655,216 B1 * | 12/2003 | Aizawa | 73/715 |
| 7,921,726 B2 * | 4/2011 | Ellegood | 73/740 |
| 8,316,722 B2 * | 11/2012 | Bitto et al. | 73/861.357 |

FOREIGN PATENT DOCUMENTS

| | | |
|---|---|---|
| DE | 101 47 090 | 4/2003 |
| EP | 1 158 278 | 11/2001 |

\* cited by examiner

DEVICE AND PROCESS FOR DETERMINING THE FLOW REGIME AND/OR THE DIRECTION OF A FLUID FLOW

FIELD OF THE INVENTION

This invention relates in a general way to the determination of the flow regime and/or the direction of a fluid flow.

The invention relates more particularly to a device for determining the flow regime and/or the direction of a fluid flow in the vicinity of an element that is subjected to said flow, such as a sail, using at least one tell-tale, such as a strand of wool, a portion of material, a portion of magnetic tape, or a portion of a strip. The invention also relates to the use of such a device for determining—as well as a process for determining—the flow regime and/or the direction of a fluid flow.

BACKGROUND OF THE INVENTION

Sailboats generally comprise one or more tell-tales attached to the rigging or to certain parts of the sail. The tell-tales generally come in the form of light streamers, made of material or wool, so as to follow the flow of the wind. The tell-tales are thus commonly used by the helmsman to display the direction of the wind, and thus the flow regime, laminar or turbulent, of the flow of air on the sail. This information is used by the helmsman to set his sail in order to optimize the aerodynamic flow around the sail so as to increase the thrust of the wind in the sail and thus the speed of the sailboat.

The tell-tales generally extend from the leading edge of the sail up to the rear part of the sail. When the tell-tale extends horizontally in a uniform and stationary manner within the air flow, the flow over the sail is laminar. A laminar flow corresponds to the optimum adjustment of the sail.

Any other position of the tell-tale reflects a disrupted flow of air around the sail, i.e., a turbulent flow. Such a turbulent flow is very unstable and chaotic, which impairs the aerodynamic yield of the sail. The helmsman modifies the path of the boat and/or then corrects the setting of the sail by adjusting the sheet, the sheet traveler and/or the leech line, until a laminar flow of the air is obtained around the sail.

However, in darkness or when meteorological conditions are poor, it is no longer possible to display the tell-tales. The helmsman no longer has information on the air flow regime around the sail and therefore can no longer optimize the settings of this sail.

A solution is proposed by the document U.S. Pat. No. 5,877,415 that describes a device for detecting the flow regime of the air along a surface. This device essentially comprises a tell-tale and a disk that is mounted to rotate around a shaft, to which the tell-tale is attached. When the air flow is turbulent and moves the tell-tale, the disk pivots around its axis of rotation. The rotational movement of the disk is detected and converted into an electrical signal that is transmitted to a processing unit. The electrical signal is then displayed in such a way that the user can derive from it the degree of turbulence of the air flow and thus consequently set the sail to obtain a laminar flow.

However, this solution makes it necessary to connect the tell-tale to an element that is mounted to rotate around an axis of rotation. This element that is mounted to rotate around the axis of rotation is subjected to external attacks, such as wind and sea water; this creates the risk of impairing the rotational connection of this element. The risk of breakdown or malfunction of such a device is then significant.

Devices for determining characteristics of a fluid flow that comprise a flexible element that is equipped with a stress gauge are also known from the prior art, in particular the documents DE 3138985, EP 1158278, DE 10147090 and U.S. Pat. No. 3,696,673. Said flexible element is attached by one of its ends to a support element that is arranged in the fluid flow such that the deformations that are recorded by the stress gauge make it possible to identify the regime of the fluid flow. However, in such devices, the flexible element extends approximately perpendicularly to said support element such that the flexible element extends crosswise to the fluid flow that circulates in the vicinity of the support element and thus disrupts the air flow. Such devices are thus very intrusive in the sense that they disrupt and modify the flow whose characteristics it is desired to determine. These devices could be suitable for measuring the regime of the flow, but they do not make it possible to determine in a reliable manner the regime of the flow of fluid that circulates in the immediate vicinity of the support element of the flexible element. Such devices in which said flexible element extends through the fluid flow also run the risk of resonating, which does not make it possible to determine the characteristics of the flow itself. Thus, such devices are not only intrusive but in addition do not make it possible to reflect the flow regime of the fluid.

SUMMARY OF THE INVENTION

This invention has as its object to propose a device that makes it possible to determine the regime of the flow around an element such as a sail, and/or the direction of the flow, even when this element is not visible and without using parts that would be mounted in a mobile manner relative to others and that would thus be exposed to external attacks.

Another object of the invention is to propose a device for determining the flow regime and/or the direction of a fluid flow that is not very intrusive so as to neither disrupt nor modify the flow whose characteristics it is desired to determine.

For this purpose, the invention relates to a device for determining the flow regime and/or the direction of a fluid flow in the vicinity of an element that is subjected to said flow, such as a sail, whereby said device comprises at least one tell-tale, such as a strand of wool, a portion of material, a portion of magnetic tape, or a portion of a strip, characterized in that the device also comprises at least one flexible tape, such as a plate, preferably made of polymer or thin metal, of which at least one zone is made integral with the element that is subjected to said flow, whereby at least one other zone of the tape is free relative to said element so as to allow the tape to flex and whereby said free zone extends approximately parallel to said element at least in the absence of fluid flow, whereby said tell-tale is attached by one of its ends to said free zone of the flexible tape, and in that the device comprises means for converting deformations experienced by said tape into electrical signals, relative to a reference position, and means for processing said electrical signals.

A tell-tale is defined as a light, slender element that does not stand by itself such that it can be driven and carried by the fluid flow, even at low speed, by being oriented automatically according to said fluid flow without disrupting it.

In such a device according to the invention, the flexible tape is made integral directly with the element that is subjected to the fluid flow. The device therefore does not comprise mounted parts that are mobile relative to one another, which imparts to the device good resistance to external attacks such as sea water and inclement weather.

The tell-tale is moved by the fluid flow, and the flexible tape to which it is attached is thus deformed based on the flow regime and/or the direction of this flow. The use of means for converting deformations into electrical signals makes it possible to electrically transmit information relative to the deformations of the flexible tape to the processing unit. The processing unit then makes it possible to derive the flow regime and/or the direction of this flow from the electrical signals received. The device according to the invention thus makes it possible to determine the flow regime and/or the direction of this flow without the helmsman needing to see the tape and/or the tell-tale.

The use of a tell-tale makes it possible to benefit from a very light element that automatically follows the flow of fluid. The tell-tale thus exerts forces on the flexible tape that are functions of the characteristics of the flow, without disrupting the fluid flow around the element. Actually, the flexible tape is generally parallel to the air flow. It is thus possible to easily follow the forces experienced by the flexible tape because of the fluid flow without said tape disrupting the flow and therefore the measurements that are made.

In addition, the tell-tale, in particular when it is attached to the free end of the flexible tape, acts like a lever arm on said tape and makes it possible to amplify the deformations of the flexible tape.

Such a device that comprises a tell-tale that is attached to a flexible tape extending approximately parallel to the element that is subjected to said flow therefore forms a device that it is possible to consider as very slightly intrusive unlike the devices of the prior art. The determination of the characteristics of the flow of said fluid in the vicinity of the element that carries the flexible tape, in particular the flow regime, thus proves to be very precise and very reliable.

Finally, the fact of using a tell-tale that extends the tape makes it possible, if necessary, to have a visual confirmation of the flow regime and/or its direction that are determined according to the electrical signals received by the processing unit.

According to an advantageous characteristic of the invention, the means for conversion of the deformations experienced by said tape into electrical signals comprise at least one strain gauge.

The use of strain gauges makes it possible to convert—easily and in a reliable manner—the deformations of the tape into electrical signals. In addition, the strain gauges can be placed on the tape in different directions so as to determine the various components of deformation of the tape and thus to determine precisely the deformations that are linked to the flow regime and the deformations that are linked to the direction of the flow. In particular, the strain gauges make it possible to determine easily the deformations that are linked to the bending of the tape and the deformations that are linked to the twisting of the tape.

According to one embodiment of the invention, the device comprises at least one strain gauge that is attached to at least one of the two surfaces of the tape and oriented according to the plane of the tape and approximately perpendicular to the bending axis of the tape.

According to another embodiment of the invention, the device comprises at least a second strain gauge that is also oriented according to the plane of the tape and approximately perpendicular to the bending axis of the tape, whereby the two strain gauges are attached to the opposite surfaces of the tape so as to measure, when the tape bends, the deformations that are experienced by, on the one hand, the compressed part of the tape and, on the other hand, the part of the tape that is under tensile stress.

According to another embodiment of the invention, at least one pair of strain gauges that are arranged on at least one of the two surfaces of the tape is provided so as to detect the deformations of the tape due to torque exerted on the latter.

According to another embodiment of the invention, the device comprises at least two pairs of strain gauges that are arranged respectively on the two surfaces of the tape so as to detect the deformations of the tape due to torque.

According to other advantageous characteristics of the invention:
- The processing means comprise, on the one hand, means for comparing the electrical signal that is received with a reference signal corresponding to said reference position, and, on the other hand, means for determining the flow regime and/or the direction of the fluid flow based on the result of said comparison;
- The processing means also comprise means for visual or audible communication of the result of the determination of the flow regime and/or the direction of the fluid flow, intended for a user;
- The element that is subjected to said flow is a part of a sailboat, preferably rigging or a sail, whereby the fluid flow is the flow of the air.

The invention also relates to the use of a device for determining the flow regime and/or the direction of a fluid flow in the vicinity of an element that is subjected to said flow, such as a sail of a sailboat subjected to an air flow, characterized in that said device is as described above.

Finally, the invention relates to a process for determining flow regime and/or the direction of a fluid flow in the vicinity of an element that is subjected to said flow, such as a sail, using at least one tell-tale, such as a strand of wool, a portion of material, a portion of magnetic tape, or a portion of a strip, characterized in that it comprises the stages of:
- Making said element integral with at least one zone of at least one flexible tape, such as a plate, preferably made of polymer or thin metal, whereby at least one other zone of the tape is left free relative to said element so as to allow the bending of said tape, whereby said flexible tape is arranged such that said free zone extends approximately parallel to said element and whereby said tell-tale is attached by one of its ends to said free zone of the flexible tape,
- Conversion of the deformations experienced by said tape into electrical signals, relative to a reference position, and
- Processing of said electrical signals so as to determine the flow regime and/or the direction of said flow.

BRIEF DESCRIPTION OF THE DRAWINGS

The invention will be better understood from reading the following description of embodiments with reference to the accompanying drawings in which.

DESCRIPTION OF THE PREFERRED EMBODIMENTS

Figure 1:
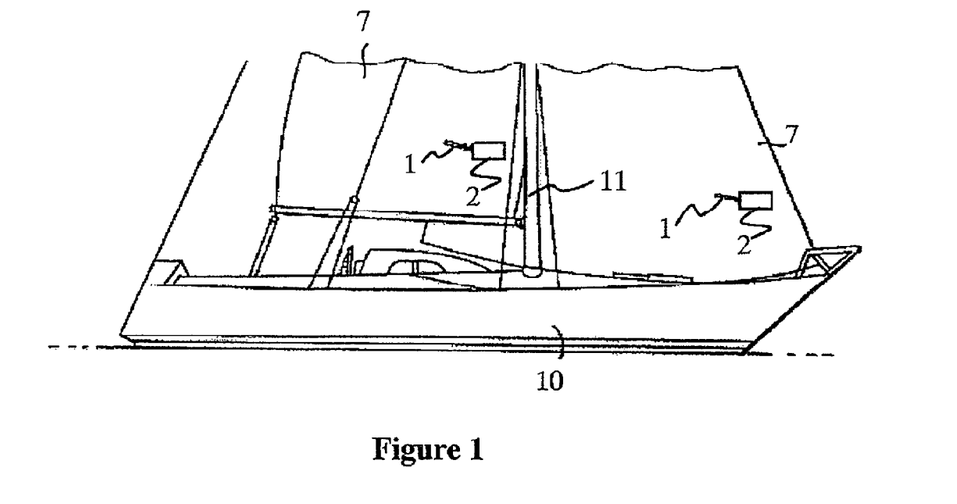
FIG. 1 is a partial side view of a sailboat that is equipped with a device for determining the flow regime and/or the direction of a fluid flow according to the invention.

FIG. 1 shows an example of a device for determining the flow regime and/or the direction of a fluid flow in the vicinity of an element 7 that is subjected to said flow. The flow regime to be determined is a turbulent or laminar regime.

The element 7 that is subjected to said flow is a part of a sailboat 10, preferably rigging 11 or a sail 7, whereby the fluid flow is the flow of the wind. In the example that is illustrated in FIGS. 1 to 6, the element 7 that is subjected to said flow is a sail 7 of a sailboat 10.

Preferably, the two lower and upper surfaces of the sail 7 are equipped with such a device for determining the flow regime and/or the direction of the flow.

Figure 2:
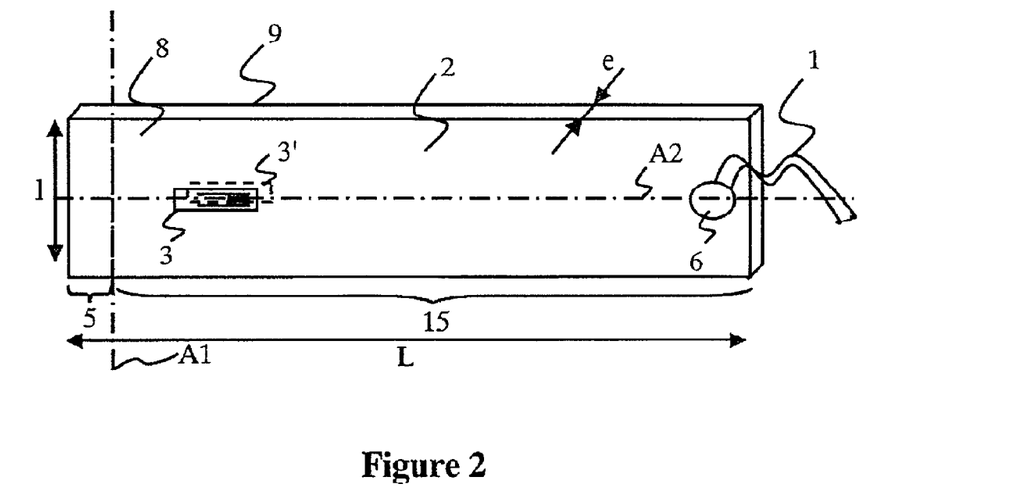
FIG. 2 is a diagrammatic side view of a part of the determination device according to a first embodiment of the invention.

In a manner that is characteristic of the invention and as illustrated in FIG. 2, the determination device comprises a flexible tape 2 of which one zone 5 is made integral with the sail 7 that is subjected to said flow. The zone 5 for making the tape 2 integral with the sail 7 forms a contact surface that, in the manner of a fitting-type connection, prevents the rotation or the translational movement of the tape relative to the sail but makes possible the bending of said tape. At least one other zone 15 of the tape 2 is free relative to the sail 7 so as to allow the bending of the tape 2. Said flexible plate 2 is extended by a tell-tale 1, such as a strand of wool, an end of material, a tip of spi fabric, a portion of magnetic tape, or a portion of a strip. Said tell-tale is attached by one of its ends to said free zone of the flexible tape. Of course, the remaining part of the tell-tale is left free so as to be driven by the flow of the fluid. The tell-tale is preferably made of a very light material such that said tell-tale follows the flow of the air as exactly as possible and is moved by the very flow at a slow flow speed, for example 5 km/h. The tell-tale is preferably impermeable to water so as not to have its weight increased by moisture. The length of the tell-tale is preferably between 1 and 20 cm.

The device also comprises means 3 for converting deformations experienced by said tape 2 into electrical signals, relative to a reference position, and means 4 for processing said electrical signals. The reference position is defined here as the position, or the deformation state, of the tape 2 for a laminar flow regime and/or a flow direction contained in the plane of the tape 2.

Thus, the device makes it possible to detect the regime of the flow or its direction without making it necessary to display the plate or the tell-tale. In addition, the device does not comprise parts that would be mounted to move relative to the others and that would thus be exposed to external attacks. Parts that are mounted to move are defined as parts that are mounted to rotate or to move translationally relative to the other parts.

Preferably, said tape 2 is a flexible plate, preferably made of polymer, such as PVC, or thin metal, such as aluminum. Another material such as Delrin® can be used. This plate is also called a test body because these are the deformations of this plate that will be detected and converted into electrical signals. By way of example, it is possible to use a plate whose dimensions are as follows:

Width 1: Approximately 50 mm
Length L: Approximately 80 mm
Thickness e: Preferably less than 1 mm The length and the width of the plate can vary so as to obtain a surface area of approximately 3 or 4 cm$^2$.

The plate 2 can be made integral with the sail 7 by being sewn or bonded by the glue or by an adhesive strip. It is also conceivable to initiate making the plate 2 integral with the sail during the production of said sail 7.

In the example that is illustrated in FIGS. 1 to 6, the plate 2 is made integral with the sail 7 by bonding the zone 5 of said plate 2 at its rear surface 9. The positioning of the engagement zone 5 makes it possible to define a potential bending axis A1 of this plate 2, which is approximately orthogonal here to the longitudinal axis A2 of the plate, i.e., approximately vertical to the engaged state of the plate 2 with the sail 7, whereby the longitudinal axis of the plate is approximately horizontal here. The engagement zone 5 extends over a length of several centimeters, here approximately 2 cm.

The means 3 for converting deformations experienced by said plate 2 into electrical signals are formed by at least one strain gauge. In the embodiments that are illustrated in the figures, the strain gauge(s) are arranged on the free zone 15 of the plate 2. The strain gauge(s) are preferably positioned in the vicinity of the potential bending axis A1, i.e., in the half of the free zone 15 that is adjacent to said axis A1.

In a general way, at least a portion of the strain gauge or each strain gauge is attached to the free zone of the plate. It is possible to ensure that the gauge or each gauge is placed astride the bending axis of the plate, whereby one part of the gauge is then attached to the zone of the plate that is integral with the sail 7 and the remaining part of the gauge is attached to the free zone of said plate.

Zone 5 of the plate 2 that is made integral with the sail 7 and zone 6 of the plate to which the tell-tale 1 is attached are respectively located at the two opposite ends of the plate 2, whereby each strain gauge is attached to said plate 2 between said ends of the plate 2. Of course, the attachment zone 6 of the tell-tale 1 to the plate 2 is part of the free zone 15 of the plate 2.

The deformations that are detected by the strain gauge are deformations that result from a flexion force and/or torsion force according to the embodiment that is considered and presented in detail below.

The forces that are applied by the tell-tale 1 on the plate 2 are representative of the movement of the tell-tale 1 and therefore of the flow regime and/or the direction of flow. These forces, to which the plate 2 is subjected, generate deformations of the plate 2 that, using each strain gauge, are converted into electrical signals that are processed by the processing means 4 to be able to be interpreted by the user. Actually, a strain gauge makes it possible to follow the deformations of an element, such as the plate 2, subjected to constraints, by means of variations of electrical resistance of an electrical conductor, with reference to FIG. 6.

Each strain gauge thus transmits to the processing unit—in the form of an electrical signal—an impedance (or resistance) value that is variable based on deformations of the plate. The signal processing that is carried out by the processing means 4 is described in more detail below.

According to a first embodiment that is illustrated in FIG. 2, the determination device comprises two strain gauges 3, 3' that are attached respectively to the two surfaces—front 8 and back 9—of the plate 2. The two strain gauges 3, 3' are oriented according to the plane of the plate 2 and are approximately perpendicular to the bending axis A1 of the plate 2. Such an orientation of the strain gauges 3, 3' makes it possible to detect—and thus to convert into electrical signals—the deformations of the plate 2 that are due to the bending. As a variant, it could be considered to detect the bending only with a single strain gauge that is arranged on one of the two surfaces of the plate 2.

In the example that is illustrated in FIG. 2, the plate 2 is slender, and the strain gauges 3, 3' are thus oriented along the longitudinal axis A2 of the plate 2.

The arrangement of the two strain gauges 3, 3' on the opposite surfaces 8, 9 of the plate 2 makes it possible to detect, when the plate 2 bends, the deformations that are experienced by, on the one hand, the part of the plate 2 in compression and, on the other hand, the part of the plate 2 that is under tensile stress. The detection of the deformations thus being more precise, the determination of the flow regime starting from these deformations is more reliable.

Figure 3:
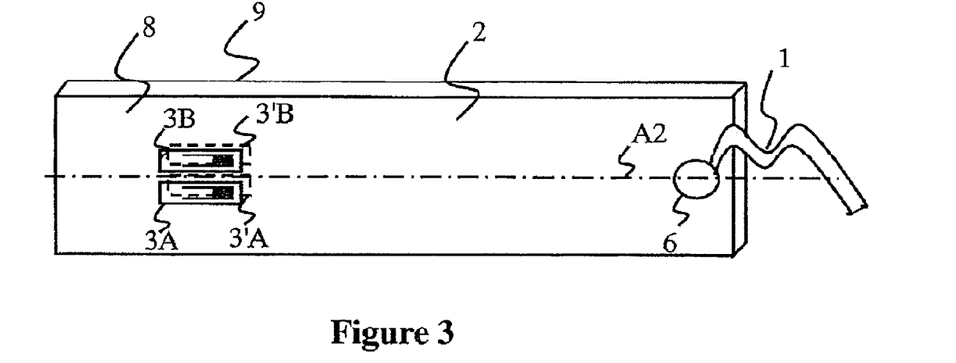
FIG. 3 is a diagrammatic side view of a part of the determination device according to a second embodiment of the invention.

According to another embodiment that is illustrated in FIG. 3 and that repeats the elements of the embodiment of FIG. 2, it is ensured that the determination device comprises two pairs of strain gauges 3A, 3B and 3'A, 3'B that are arranged respectively on the two surfaces 8, 9 of the plate 2 along the longitudinal axis A2 of the plate. The two strain gauges 3A, 3B and 3'A, 3'B of the same pair are oriented parallel relative to one another, whereby the two strain gauges of the same pair 3A, 3B, and, respectively, 3'A, 3'B are arranged on the same surface symmetrically relative to the axis A2 of longitudinal symmetry of the plate. The use of two pairs of gauges arranged on the opposite surfaces of the plate makes possible a measurement of the deformation of the plate 2 that is independent of the temperature variation that can exist from one surface to the other of the plate, for example if one of the surfaces is exposed to the sun.

Figure 4:
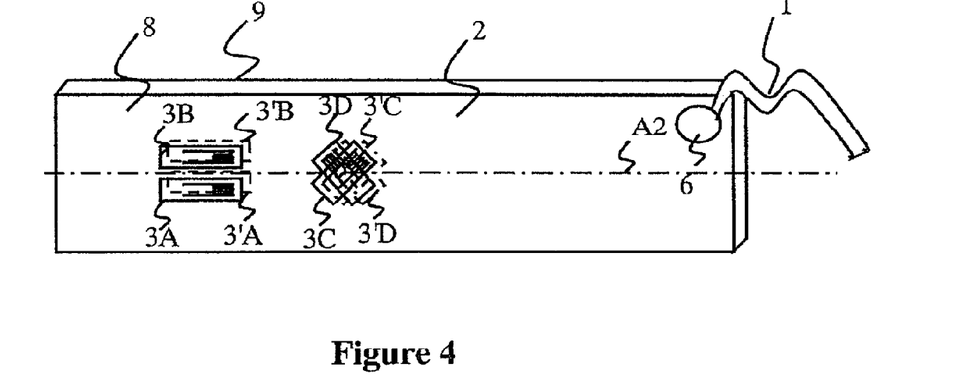
FIG. 4 is a diagrammatic side view of a part of the determination device according to a third embodiment of the invention.

According to a preferred embodiment that is illustrated in FIG. 4 and that repeats the elements of the embodiment that is illustrated in FIG. 3, the device comprises two additional pairs of strain gauges 3C, 3D and 3'C, 3'D that are arranged respectively on the two surfaces 8, 9 of the plate 2 so as to detect the deformations of the plate due to torque. In the example that is illustrated in FIG. 4, the additional strain gauges 3C, 3D and 3'C, 3'D are oriented in a cross shape at approximately 45° relative to the longitudinal axis A2 of the plate. Such an assembly of the strain gauges is commonly called a "rosette" assembly. Here, the angle between the strain gauges that are mounted in a rosette is approximately 90°, but other angle values could be considered. It is also possible to consider adding a third strain gauge to each rosette assembly, whereby each strain gauge is rotated by 30° relative to its neighbor. As a variant, it is possible to consider using a pair of gauges mounted in a rosette only on one of the surfaces of the plate 2.

Figure 5:
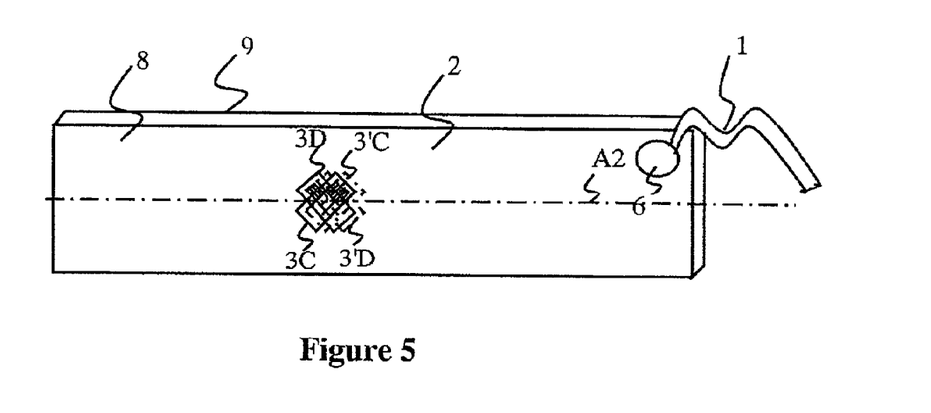
FIG. 5 is a diagrammatic side view of a part of the determination device according to a fourth embodiment of the invention.

According to an embodiment that is illustrated in FIG. 5 and that repeats some of the elements of the embodiment that is illustrated in FIG. 4, the plate 2 is only equipped on its surfaces 8, 9 with strain gauges 3C, 3D, and 3'C, 3'D that are mounted in a rosette. As a variant, it is possible to consider using one pair of gauges that are mounted in a rosette only on one of the surfaces of the plate 2. The "rosette" assembly makes it possible to detect deformations of the plate due to torque that is exerted on the latter (by the tell-tale and/or by the flow). The "rosette" assembly also makes it possible to detect deformations by bending of the plate. Of course, it is advantageous to add, as in the preferred embodiment of FIG. 4, strain gauges that are arranged in the longitudinal direction of the plate so as to improve the precision and the reliability of the detection of the bending.

Figure 6:
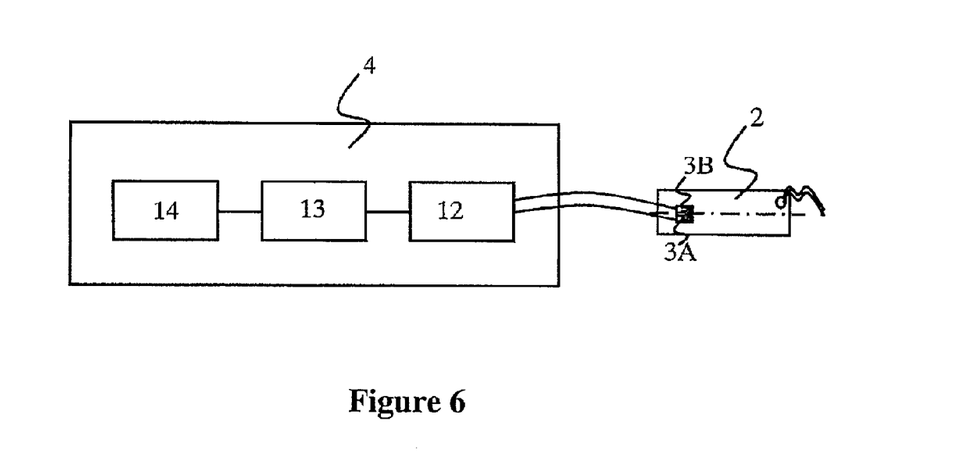
FIG. 6 is a diagrammatic view of the determination device according to the invention that comprises means for processing electrical signals.

Regardless of the embodiment that is considered above, or its variant, and as illustrated in FIG. 6, the processing means 4 comprise means 12 for comparison of the electrical signal that is received with a reference signal that corresponds to the reference position, which is the position, or the deformation state, of the plate for a laminar flow regime and/or a direction of flow that is contained in the plane of the plate 2. The processing means 4 also comprise means 13 for determining the flow regime and/or the direction of fluid flow based on the result of this comparison. The strain gauges are calibrated so as to establish the corresponding reference signal.

To each reference signal value, a so-called sensitivity value that is selected during the calibration is added and subtracted to obtain respectively an upper threshold value and a lower threshold value.

The processing means 4 also comprise means 14 for communicating the result of the determination of the flow regime and/or the direction of the fluid flow, intended for a user. Preferably, the communication means 14 are of the visual type, such as a light or a display screen, but it may also be considered as a variant that the communication means 14 are of the audible type. The processing means 4 can also comprise an electronic repeater.

The information of the flow regime and/or the direction of the flow communicated by the communication means 14 makes it possible to warn the user, here the helmsman or "skipper," of the relevance of the settings of the sail.

When the comparison means 12 detect that the instantaneous value of the flexion moment to which the plate 2 is subjected is included in the range of predetermined upper and lower threshold values, the determination means 13 conclude that the flow regime is laminar. The setting of the sail is then correct. Conversely, when the instantaneous value of the flexion moment is beyond this range of upper and lower threshold values, the determination means 13 conclude that the flow regime is turbulent. This information is communicated by the communication means 14 to the user who can then set the sail so as to obtain a laminar flow regime. The comparison of the instantaneous value of the flexion moment relative to the reference value can be produced over a given interval of time to improve the reliability of the result of the comparison.

When the determination device is in accordance with one of the embodiments as shown in FIGS. 4 and 5, or according to one of their variants, and when the comparison means detect an instantaneous value of torque located between the predetermined upper and lower threshold values, the determination means 13 conclude that the direction of the flow is contained in the mid-plane of the plate. The setting of the sail is then correct. Conversely, when the instantaneous value of the torque is beyond upper and lower threshold values, the determination means 13 conclude that the direction of the flow is not optimum since it is not contained in the mid-plane of the plate. This information is communicated by communication means 14 to the user who can then set the sail so as to obtain the optimum direction of the flow. The comparison of the instantaneous value of the torque relative to the reference value can be implemented over a given time interval to improve the reliability of the result of the comparison.

The determination device can also be combined with a device for automatic control of the setting of the configuration of an element that is subjected to a fluid flow. The automatic control device is then designed to automatically control the setting of the configuration of said element based on the result of the determination of the flow regime and/or the direction of the fluid flow. The information, in the form of an electrical signal provided by the determination device, then makes possible an automatic control, by the automatic control device, for setting the sail so as to keep a laminar flow around said sail.

The device as illustrated in FIGS. 1 to 6 also makes it possible to determine visually in a conventional manner if the tell-tale oscillates or remains straight in the air flow, which respectively reflects a turbulent or laminar air flow. This makes it possible to confirm visually, if necessary, the result that is provided by the determination device and also facilitates the calibration of the strain gauges of this determination device.

This invention is in no way limited to the embodiments that are described and shown, but one skilled in the art will know how to provide any variant there in keeping with its spirit.

For the purpose of protecting the tell-tale from tearing, it is possible to consider using a winding system that makes it possible to retract the tell-tale when the determination device is not used.

In the case of a sailboat as described above and illustrated in FIG. 1, it is also possible to ensure that the plate is made integral with any part of the rigging 11.

Still within the maritime field, such a determination device can also be used to determine the flow regime and/or the direction of flow of the water around an immersed part of a sailboat or a boat, such as a keel, a keel fin, a tail fin, foils, rudder blade, or any part of the hull, and to make possible the setting, optionally automatic, of the orientation of said part, based on the determined information.

Such a determination device is also applicable to any element that is subjected to said flow around which it is useful to be able to determine the flow regime and/or the direction of a flow. For example, such a determination device can thus be used to determine the flow regime and/or the direction of the flow of the air around a skier, a cyclist, or a part such as the sail of a sail flying device, or else a paraglider.

Such a determination device is also advantageously applicable in the automobile field for determining the flow of the air around an appendage that is subjected to a flow such as a rear aileron so as to make possible the optionally automatic setting of this appendage to reduce or increase the overall drag of the vehicle. The determination device can also be used to search for specific support points of the flow on said appendage.

Such a determination device can also be used to determine the flow regime at the outlet of a chimney. In a general way, the determination device according to the invention can be used to optimize the fluid flow into industrial ducts such as elbow discharge points or butterfly valves.

Finally, in the aeronautical field, such a determination device can be used to detect the flow regime around parts of an aircraft, such as the ailerons or the tail fin, for detecting the offset and to set, optionally automatically, the orientation of these parts based on the determined information.

The invention claimed is:

1. Device for determining the flow regime and/or the direction of a fluid flow in the vicinity of an element (7) that is subjected to said flow, such as a sail (7), whereby said device comprises at least one tell-tale (1), such as a strand of wool, a portion of material, a portion of magnetic tape, or a portion of a strip, characterized in that the device also comprises at least one flexible tape (2), such as a plate, preferably made of polymer or thin metal, of which at least one zone (5) is made integral with the element (7) that is subjected to said flow, whereby at least one other zone (15) of the tape (2) is free relative to said element (7) so as to make possible the bending of the tape (2) and whereby said free zone (15) extends approximately parallel to said element (7) at least in the absence of fluid flow, whereby said tell-tale is attached by one of its ends to said free zone of the flexible tape, and in that the device comprises means (3, 3', 3A, 3B, 3'A, 3'B, 3C, 3D, 3'C, 3'D) for conversion of deformations experienced by said tape (2) into electrical signals, relative to a reference position, and means (4) for processing said electrical signals.

2. Device according to claim 1, wherein the means (3, 3', 3A, 3B, 3'A, 3'B, 3C, 3D, 3'C, 3'D) for conversion of the deformations experienced by said tape (2) into electrical signals are formed by at least one strain gauge (3, 3', 3A, 3B, 3'A, 3'B, 3C, 3D, 3'C, 3'D).

3. Device according to claim 2, wherein it comprises at least one strain gauge (3, 3', 3A, 3B, 3'A, 3'B, 3C, 3D, 3'C, 3'D) that is attached to at least one of the two surfaces (8, 9) of the tape (2) and oriented according to the plane of the tape (2) and approximately perpendicular to the bending axis (A1) of the tape (2).

4. Device according to claim 3, wherein it comprises at least a second strain gauge (3, 3', 3A, 3B, 3'A, 3'B) that is also oriented along the plane of the tape (2) and approximately perpendicular to the bending axis (A1) of the tape (2), whereby the two strain gauges (3, 3', 3A, 3B, 3'A, 3'B) are attached to the opposite surfaces (8, 9) of the tape (2) so as to measure, when the tape (2) bends, the deformations that are experienced by, on the one hand, the compressed part of the tape (2) and, on the other hand, the part of the tape (2) that is under tensile stress.

5. Device according to claim 3, wherein it comprises at least one pair of strain gauges (3C, 3D, 3'C, 3'D) that are arranged on at least one of the two surfaces (8, 9) of the tape (2) so as to detect the deformations of the tape (2) due to torque that is exerted on the latter.

6. Device according to claim 3, wherein the processing means (4) comprise, on the one hand, means (12) for comparison of the electrical signal that is received with a reference signal that corresponds to said reference position, and, on the other hand, means (13) for determining the flow regime and/or the direction of the fluid flow based on the result of said comparison.

7. Device according to claim 3, wherein the element (7) that is subjected to said flow is a part of a sailboat (10), preferably rigging (11) or a sail (7), whereby the fluid flow is the flow of air.

8. Device according to claim 2, wherein it comprises at least a second strain gauge (3, 3', 3A, 3B, 3'A, 3'B) that is also oriented along the plane of the tape (2) and approximately perpendicular to the bending axis (A1) of the tape (2), whereby the two strain gauges (3, 3', 3A, 3B, 3'A, 3'B) are attached to the opposite surfaces (8, 9) of the tape (2) so as to measure, when the tape (2) bends, the deformations that are experienced by, on the one hand, the compressed part of the tape (2) and, on the other hand, the part of the tape (2) that is under tensile stress.

9. Device according to claim 8, wherein it comprises at least one pair of strain gauges (3C, 3D, 3'C, 3'D) that are arranged on at least one of the two surfaces (8, 9) of the tape (2) so as to detect the deformations of the tape (2) due to torque that is exerted on the latter.

10. Device according to claim 8, wherein the processing means (4) comprise, on the one hand, means (12) for comparison of the electrical signal that is received with a reference signal that corresponds to said reference position, and, on the other hand, means (13) for determining the flow regime and/or the direction of the fluid flow based on the result of said comparison.

11. Device according to claim 8, wherein the element (7) that is subjected to said flow is a part of a sailboat (10), preferably rigging (11) or a sail (7), whereby the fluid flow is the flow of air.

12. Device according to claim 2, wherein it comprises at least one pair of strain gauges (3C, 3D, 3'C, 3'D) that are arranged on at least one of the two surfaces (8, 9) of the tape (2) so as to detect the deformations of the tape (2) due to torque that is exerted on the latter.

13. Device according to claim 12, wherein the processing means (4) comprise, on the one hand, means (12) for comparison of the electrical signal that is received with a reference signal that corresponds to said reference position, and, on the other hand, means (13) for determining the flow regime and/or the direction of the fluid flow based on the result of said comparison.

14. Device according to claim 2, wherein the processing means (4) comprise, on the one hand, means (12) for comparison of the electrical signal that is received with a reference signal that corresponds to said reference position, and, on the other hand, means (13) for determining the flow regime and/or the direction of the fluid flow based on the result of said comparison.

15. Device according to claim 2, wherein the element (7) that is subjected to said flow is a part of a sailboat (10), preferably rigging (11) or a sail (7), whereby the fluid flow is the flow of air.

16. Device according to claim 1, wherein the processing means (4) comprise, on the one hand, means (12) for comparison of the electrical signal that is received with a reference signal that corresponds to said reference position, and, on the other hand, means (13) for determining the flow regime and/or the direction of the fluid flow based on the result of said comparison.

17. Device according to claim 16, wherein the processing means (4) also comprise visual or audible communication means (14) of the result of the determination of the flow regime and/or the direction of the fluid flow, intended for a user.

18. Device according to claim 1, wherein the element (7) that is subjected to said flow is a part of a sailboat (10), preferably rigging (11) or a sail (7), whereby the fluid flow is the flow of air.

19. Use of a device for the determination of the flow regime and/or the direction of a fluid flow in the vicinity of an element (7) that is subjected to said flow, such as a sail (7) of a sailboat (10) that is subjected to an air flow, wherein said device is in accordance with claim 1.

20. Process for determining the flow regime and/or the direction of a fluid flow in the vicinity of an element (7) that is subjected to said flow, such as a sail (7), using at least one tell-tale (1), such as a wool strand, a portion of material, a portion of magnetic tape, or a portion of a strip, wherein it comprises the stages of:

making said element (7) integral with at least one zone (5) of at least one flexible tape (2), such as a plate, preferably made of polymer or thin metal, whereby at least one other zone (15) of the tape (2) is left free relative to said element (7) so as to allow the bending of said tape (2), whereby said flexible tape is arranged such that said free zone (15) extends approximately parallel to said element (7), and whereby said tell-tale is attached by one of its ends to said free zone (15) of the flexible tape, conversion of the deformations experienced by said tape (2) into electrical signals, relative to a reference position, and processing (4) of said electrical signals so as to determine the flow regime and/or the direction of said flow.

* * * * *

UNITED STATES PATENT AND TRADEMARK OFFICE
CERTIFICATE OF CORRECTION

PATENT NO.       : 8,397,564 B2                                      Page 1 of 1
APPLICATION NO. : 12/675565
DATED            : March 19, 2013
INVENTOR(S)      : Voisin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

First Day of September, 2015

Michelle K. Lee
*Director of the United States Patent and Trademark Office*